(12) United States Patent
Cui et al.

(10) Patent No.: US 8,539,411 B2
(45) Date of Patent: Sep. 17, 2013

(54) MULTIPLE DERATING FACTOR SETS FOR DELAY CALCULATION AND LIBRARY GENERATION IN MULTI-CORNER STA SIGN-OFF FLOW

(75) Inventors: Qian Cui, San Jose, CA (US); Sandeep Bhutani, Pleasanton, CA (US)

(73) Assignee: LSI Corporation, San Jose, CA (US)

( * ) Notice: Subject to any disclaimer, the term of this patent is extended or adjusted under 35 U.S.C. 154(b) by 1040 days.

(21) Appl. No.: 12/072,478

(22) Filed: Feb. 26, 2008

(65) Prior Publication Data

US 2009/0217226 A1    Aug. 27, 2009

(51) Int. Cl.
*G06F 17/50*        (2006.01)
(52) U.S. Cl.
USPC ........................................................ 716/111
(58) Field of Classification Search
USPC .................................. 716/106–109, 113, 111
See application file for complete search history.

(56) References Cited

U.S. PATENT DOCUMENTS

| | | | |
|---|---|---|---|
| 6,090,152 A * | 7/2000 | Hayes et al. | 716/113 |
| 6,484,297 B1 * | 11/2002 | Dixit et al. | 716/113 |
| 6,820,048 B1 | 11/2004 | Bhutani et al. | |
| 6,857,110 B1 * | 2/2005 | Rupp et al. | 716/136 |
| 7,092,838 B1 * | 8/2006 | Srinivas et al. | 702/117 |
| 2004/0025136 A1 * | 2/2004 | Carelli, Jr. | 716/17 |

* cited by examiner

*Primary Examiner* — Vuthe Siek
*Assistant Examiner* — Aric Lin
(74) *Attorney, Agent, or Firm* — Suiter Swantz pc llo

(57) ABSTRACT

An apparatus and method to characterize a new process using an improved delay calculation. Multiple derating factors are used for different STA sign off corners that have a base corner with two pairs of off-corners. The approach of the present invention does not add any extra work in cell library characterization, while in the mean it increases the accuracy of the delay calculation and the library generation at corners other than standard corners.

17 Claims, 3 Drawing Sheets

| Ramp | Load | DRchar | DRdera 1 | %Diff 1 | DRdera2 | %Diff 2 |
|---|---|---|---|---|---|---|
| 0.0025 | 0.0016 | 0.0216 | 0.022 | 1.9021 | 0.0216 | 0 |
| 0.0025 | 0.0064 | 0.0341 | 0.0347 | 1.891 | 0.034 | -0.2984 |
| 0.0025 | 0.0256 | 0.0827 | 0.0843 | 1.9153 | 0.0822 | -0.6123 |
| 0.0025 | 0.1024 | 0.2601 | 0.2679 | 2.9797 | 0.2604 | 0.108 |
| 0.0025 | 0.4096 | 0.9561 | 0.9853 | 3.0626 | 0.9564 | 0.0304 |
| 0.0025 | 1.6384 | 3.7407 | 3.8558 | 3.0761 | 3.7407 | 0 |
| 0.0041 | 0.0016 | 0.0259 | 0.0272 | 4.9046 | 0.0267 | 3.1764 |
| 0.0041 | 0.0064 | 0.0383 | 0.0391 | 2.1189 | 0.0383 | 0.0717 |
| 0.0041 | 0.0256 | 0.087 | 0.0886 | 1.832 | 0.0865 | -0.6136 |
| 0.0041 | 0.1024 | 0.2641 | 0.2723 | 3.0857 | 0.2648 | 0.2445 |
| 0.0041 | 0.4096 | 0.9602 | 0.9897 | 3.0742 | 0.9607 | 0.0528 |
| 0.0041 | 1.6384 | 3.7448 | 3.8599 | 3.0729 | 3.7448 | 0.0011 |
| 0.0068 | 0.0016 | 0.0344 | 0.0358 | 3.9862 | 0.0353 | 2.5007 |
| 0.0068 | 0.0064 | 0.0473 | 0.0484 | 2.2867 | 0.0476 | 0.4972 |
| 0.0068 | 0.0256 | 0.0958 | 0.098 | 2.2043 | 0.0958 | -0.0804 |
| 0.0068 | 0.1024 | 0.2731 | 0.2816 | 3.1036 | 0.274 | 0.3355 |
| 0.0068 | 0.4096 | 0.9691 | 0.9989 | 3.083 | 0.9699 | 0.0859 |
| 0.0068 | 1.6384 | 3.7537 | 3.8688 | 3.0659 | 3.7538 | 0.0028 |
| 0.0112 | 0.0016 | 0.0492 | 0.0502 | 2.0644 | 0.0496 | 0.815 |
| 0.0112 | 0.0064 | 0.0607 | 0.0624 | 2.7761 | 0.0615 | 1.2119 |
| 0.0112 | 0.0256 | 0.1099 | 0.1124 | 2.2738 | 0.1101 | 0.1893 |
| 0.0112 | 0.1024 | 0.2868 | 0.296 | 3.1868 | 0.2883 | 0.5187 |
| 0.0112 | 0.4096 | 0.9826 | 1.0131 | 3.1036 | 0.984 | 0.1421 |
| 0.0112 | 1.6384 | 3.7673 | 3.8825 | 3.0575 | 3.7676 | 0.0078 |
| 0.0185 | 0.0016 | 0.0717 | 0.0728 | 1.5043 | 0.072 | 0.407 |
| 0.0185 | 0.0064 | 0.0852 | 0.0871 | 2.332 | 0.086 | 1.0158 |
| 0.0185 | 0.0256 | 0.1331 | 0.1364 | 2.512 | 0.134 | 0.6656 |
| 0.0185 | 0.1024 | 0.3095 | 0.3197 | 3.3044 | 0.3119 | 0.7824 |
| 0.0185 | 0.4096 | 1.005 | 1.0365 | 3.133 | 1.0073 | 0.2282 |
| 0.0185 | 1.6384 | 3.7895 | 3.9049 | 3.0442 | 3.7901 | 0.0162 |

| | | | | | | |
|---|---|---|---|---|---|---|
| 0.0306 | 0.0016 | 0.1079 | 0.1091 | 1.1042 | 0.108 | 0.1111 |
| 0.0306 | 0.0064 | 0.123 | 0.1252 | 1.8142 | 0.1238 | 0.6727 |
| 0.0306 | 0.0256 | 0.1705 | 0.1731 | 1.5091 | 0.1703 | -0.095 |
| 0.0306 | 0.1024 | 0.3456 | 0.3573 | 3.3902 | 0.3493 | 1.059 |
| 0.0306 | 0.4096 | 1.0403 | 1.0733 | 3.1757 | 1.044 | 0.3546 |
| 0.0306 | 1.6384 | 3.8246 | 3.94 | 3.0163 | 3.8255 | 0.0223 |
| 0.0504 | 0.0016 | 0.1662 | 0.1676 | 0.8551 | 0.1661 | -0.0701 |
| 0.0504 | 0.0064 | 0.1837 | 0.1859 | 1.2096 | 0.184 | 0.1926 |
| 0.0504 | 0.0256 | 0.2358 | 0.2419 | 2.5579 | 0.2387 | 1.206 |
| 0.0504 | 0.1024 | 0.4098 | 0.4238 | 3.4256 | 0.4153 | 1.3585 |
| 0.0504 | 0.4096 | 1.1023 | 1.1378 | 3.2219 | 1.1082 | 0.5367 |
| 0.0504 | 1.6384 | 3.8858 | 4.0015 | 2.9766 | 3.8874 | 0.0399 |
| 0.0832 | 0.0016 | 0.2612 | 0.2633 | 0.7896 | 0.261 | -0.0946 |
| 0.0832 | 0.0064 | 0.2823 | 0.2848 | 0.863 | 0.2821 | -0.0706 |
| 0.0832 | 0.0256 | 0.3434 | 0.3497 | 1.8555 | 0.3458 | 0.7082 |
| 0.0832 | 0.1024 | 0.5219 | 0.539 | 3.2725 | 0.5299 | 1.5184 |
| 0.0832 | 0.4096 | 1.2104 | 1.2495 | 3.2308 | 1.2195 | 0.7509 |
| 0.0832 | 1.6384 | 3.9912 | 4.1078 | 2.9217 | 3.9943 | 0.0788 |
| 0.1373 | 0.0016 | 0.4157 | 0.4188 | 0.7436 | 0.4152 | -0.1186 |
| 0.1373 | 0.0064 | 0.4416 | 0.4449 | 0.7398 | 0.441 | -0.1439 |
| 0.1373 | 0.0256 | 0.5141 | 0.5205 | 1.2532 | 0.5153 | 0.2458 |
| 0.1373 | 0.1024 | 0.7006 | 0.7209 | 2.8938 | 0.7106 | 1.4258 |
| 0.1373 | 0.4096 | 1.3872 | 1.4316 | 3.1998 | 1.4009 | 0.9863 |
| 0.1373 | 1.6384 | 4.1671 | 4.2802 | 2.7137 | 4.1678 | 0.0167 |
| 0.2266 | 0.0016 | 0.6683 | 0.6732 | 0.7359 | 0.6675 | -0.1149 |
| 0.2266 | 0.0064 | 0.6998 | 0.7044 | 0.6572 | 0.6984 | -0.1992 |
| 0.2266 | 0.0256 | 0.7853 | 0.7927 | 0.9377 | 0.7855 | 0.0178 |
| 0.2266 | 0.1024 | 1.0048 | 1.0287 | 2.3788 | 1.0166 | 1.1698 |
| 0.2266 | 0.4096 | 1.6863 | 1.7376 | 3.0442 | 1.7058 | 1.156 |
| 0.2266 | 1.6384 | 4.4574 | 4.5725 | 2.5815 | 4.4619 | 0.0998 |
| 0.3739 | 0.0016 | 1.0814 | 1.0903 | 0.8228 | 1.0811 | -0.0236 |
| 0.3739 | 0.0064 | 1.1175 | 1.1267 | 0.8201 | 1.1172 | -0.0249 |
| 0.3739 | 0.0256 | 1.2206 | 1.2303 | 0.7973 | 1.2197 | -0.071 |
| 0.3739 | 0.1024 | 1.4793 | 1.5018 | 1.5208 | 1.4866 | 0.4918 |
| 0.3739 | 0.4096 | 2.1863 | 2.2462 | 2.738 | 2.2124 | 1.1959 |
| 0.3739 | 1.6384 | 4.9391 | 5.051 | 2.2659 | 4.9433 | 0.0855 |
| 0.617 | 0.0016 | 1.7592 | 1.7741 | 0.8462 | 1.7592 | 0.0006 |
| 0.617 | 0.0064 | 1.8004 | 1.8154 | 0.8348 | 1.8003 | -0.0058 |
| 0.617 | 0.0256 | 1.9233 | 1.938 | 0.7646 | 1.9218 | -0.076 |
| 0.617 | 0.1024 | 2.2336 | 2.2541 | 0.9179 | 2.2338 | 0.0093 |
| 0.617 | 0.4096 | 3.0217 | 3.0905 | 2.2767 | 3.0537 | 1.0585 |
| 0.617 | 1.6384 | 5.7439 | 5.8468 | 1.7909 | 5.7439 | 0 |

*FIG. 2B*

MULTIPLE DERATING FACTOR SETS FOR DELAY CALCULATION AND LIBRARY GENERATION IN MULTI-CORNER STA SIGN-OFF FLOW

CROSS-REFERENCE TO RELATED APPLICATIONS

[none]

BACKGROUND OF THE INVENTION

1. Field of Invention

The present invention relates generally to the art of microelectronic integrated circuits. In particular, the present invention relates to the art of computing delays for cells in ASICs.

2. Description of Related Art

An integrated circuit chip (hereafter referred to as an "integrated circuit" (IC), "ASIC", or a "chip") comprises cells and connections between the cells formed on a surface of a semiconductor substrate. The IC may include a large number of cells and require complex connections between the cells.

A cell is a group of one or more circuit elements such as transistors, capacitors, and other basic circuit elements grouped to perform a function. Each of the cells of an IC may have one or more pins, each of which, in turn, may be connected to one or more other pins of the IC by wires. The wires connecting the pins of the IC are also formed on the surface of the chip.

A net is a set of two or more pins which must be connected. Because a typical chip has thousands, tens of thousands, or hundreds of thousands of pins which must be connected in various combinations, the chip also includes definitions of thousands, tens of thousands, or hundreds of thousands of nets, or sets of pins. All the pins of a net must be connected. The number of the nets for a chip is typically in the same order as the order of the number of cells on that chip. Commonly, a majority of the nets include only two pins to be connected; however, many nets comprise three or more pins. Some nets may include hundreds of pins to be connected. A netlist is a list of nets for a chip; more generally a netlist is a description of the logic cells and their connections.

Microelectronic integrated circuits consist of a large number of electronic components that are fabricated by layering several different materials on a silicon base or wafer. The design of an integrated circuit transforms a circuit description into a geometric description which is known as a layout. A layout consists of a set of planar geometric shapes in several layers.

The layout is then checked to ensure that it meets all of the design requirements. The result is a set of design files in a particular unambiguous representation known as an intermediate form that describes the layout. The design files are then converted into pattern generator files that are used to produce patterns called masks by an optical or electron beam pattern generator.

During fabrication, these masks are used to pattern a silicon wafer using a sequence of photolithographic steps. The component formation requires very exacting details about geometric patterns and separation between them. The process of converting the specifications of an electrical circuit into a layout is called the physical design.

Currently, the minimum geometric feature size of a component is on the order of less than 45 nm, at the process node of 45 nm. Feature sizes will be reduced even further as technology progresses. This small feature size allows fabrication of many transistors on a chip. This trend is expected to continue, with even smaller feature geometries and more circuit elements on an integrated circuit, and of course, larger die (or chip) sizes will allow far greater numbers of circuit elements on them.

ASIC design flow is a combination of logical design and physical design, and includes a variety of steps, which include and are not limited to design entry, logic synthesis, system partitioning, floorplanning, placement, routing, and simulation, with constant feedback in these processes. The objective of physical design is to determine an optimal arrangement of devices in a plane or in a three dimensional space, and an efficient interconnection or routing scheme between the devices to obtain the desired functionality. Libraries characterize different devices and components used in the ASIC design flow, with the components simulated according to the program SPICE (Simulation Program with Integrated Circuit Emphasis), a general purpose analog electronic circuit simulator used in IC design to check the integrity of circuit designs and to predict circuit behavior. Libraries exist to characterize semiconductor devices at various parameters including process node, voltage, temperature and the like.

ASIC designers further need a timing model for each cell used in an ASIC to determine the performance of the ASIC, including timing closure. Timing closure includes the ability of an ASIC cell or block to transmit and/or process a signal within specified time parameters in a specification. Various types of delay exist in an IC including but not limited to pin-to-pin delay between input and output pins of a logic cell, pin delay, and net or wire delay. Typically it is too time-consuming to build every cell in silicon and measure actual cell delays, instead, designers simulate the delay in a cell, a process called characterization.

Due to the large number of components and the exacting details required by the fabrication process, logical and physical design is not practical without the aid of computers. As a result, most phases of physical design extensively use Computer Aided Design (CAD) tools, and many phases have already been partially or fully automated. Automation of the physical design process has increased the level of integration, reduced turn around time and enhanced chip performance.

In an ASIC, the layout design process involves several steps. The input to the physical design problem is a circuit diagram, and the output is the layout of the circuit. This is accomplished in several stages including partitioning, floor planning, placement, routing and compaction.

Regarding partitioning, a chip may contain several million transistors. Layout of the entire circuit cannot be handled due to the limitation of memory space as well as the computation power available. Therefore, the layout is normally partitioned by grouping the components into blocks such as sub-circuits and modules. The actual partitioning process considers many factors such as the size of the blocks, number of blocks and number of interconnections between the blocks.

The output of partitioning is a set of blocks, along with the interconnections required between blocks. The set of interconnections required is the netlist. In large circuits, the partitioning process is often hierarchical, although non-hierarchical (e.g. flat) processes can be used, and at the topmost level a circuit can have between 5 to 25 or more blocks. However, greater numbers of blocks are possible and contemplated. Each block is then partitioned recursively into smaller blocks.

Regarding floor planning and placement, this step is concerned with selecting good layout alternatives for each block of the entire chip, as well as between blocks and to the edges. Floor planning is a critical step as it sets up the ground work for a good layout. During placement, the blocks are exactly positioned on the chip. The goal of placement is to find a minimum area arrangement for the blocks that allows completion of interconnections between the blocks. Placement is typically done in two phases. In the first phase, an initial placement is created. In the second phase, the initial placement is evaluated and iterative improvements are made until the layout has minimum area and conforms to design specifications.

Regarding routing, the objective of the routing phase is to complete the interconnections between blocks according to the specified netlist. First, the space not occupied by blocks, which is called the routing space, is partitioned into rectangular regions called channels. The goal of a router is to complete all circuit connections using the shortest possible wire length and using only the channel. Routing is usually done in two phases referred to as the global routing and detailed routing phases. In global routing, connections are completed between the proper blocks of the circuit disregarding the exact geometric details of each wire and terminal. For each wire, a global router finds a list of channels that are to be used as a passageway for that wire. In other words, global routing specifies the loose route of a wire through different regions of the routing space.

Global routing is followed by detailed routing which completes point-to-point connections between terminals on the blocks. Loose routing is converted into exact routing by specifying the geometric information such as width of wires and their layer assignments. Detailed routing includes the exact channel routing of wires.

In order for circuit designers to calculate the performance of ASICs, the designers need to compute the delays of the cells in the ASICs. Two types of delays are considered. The first type of delay is the propagation delay of a cell. A propagation delay of a cell is defined as the time duration a signal takes to travel from the input to the output of a cell. The measurement point at the input is called the switching threshold. A propagation delay of a cell is defined for every input to output pin combination of a cell under both the rising and falling input conditions. The propagation delay is also affected by a given process (P), voltage (V) and temperature (T).

The second type of delay is the setup/hold time delay which is an input constraint for sequential cells. The setup time is defined as the time duration a data signal is required to be available at the input of a cell before the clock signal transition, and the hold time is defined as the time duration a data signal is required to be stable after the clock signal transition. For the purpose of explanation, both propagation delay and setup/hold time, can be referred as delay.

As the semiconductor industry advances to a smaller process node, especially 90 nm and below, there is a need for more sign-off corners in STA (statistical timing analysis). Corners is a term of art and may be thought of as extremes in process (P), voltage (V) and temperature (T) at which a circuit design has to achieve timing closure for a particular time requirement and operate according to specification; a sign-off is a guarantee that the circuit can perform at a particular corner combination. A sign-off corner is thus a sort of factor of safety that a chip or ASIC can operate satisfactorily.

However, more sign-off corners have a drawback: more library generation at each specific corner, which results in tremendous characterization time. By way of example, a cell library may have as parameters three external variables P (process, i.e., N-doped/P-doped parameters at a particular feature size), T (temperature) and V (voltage), with each of these variables being split into nominal (NOM), best case (BC) or worse case (WC), to factor in a factor of safety, with temperature varying from a low of say −40 C to a high of 125 C, and voltage varying +/−10% from VDD. If one were to generate all corner libraries for all the different PVT combinations to satisfy all possible customers, there might be over twenty combinations, such as: BC PVT (best case for P, V and T); BC PV+WC T (best case for P, V and worse case for T); BC P+WC VT (best case for P, worse case for V and T); WC PVT (worse case P, V and T); WC PV+BC T (worse case P, V and best case T); and WC P+BC VT (worse case P and best case V, T).

A derating equation is used to rapidly compute the delay in an ASIC cell; otherwise calculating delay would take longer. The derating equation(s) used by the assignee of the present invention to compute the delay of a cell for a given P, V and T of a cell is given by U.S. Pat. No. 6,820,048 (the '048 patent), issued to Bhutani et al. (Nov. 16, 2004), and U.S. Pat. No. 6,484,297 (the '297 patent), issued to Dixit et al. (Nov. 19, 2002), all incorporated herein by reference in their entireties.

Further, the following equations are used for deratings, which are derivatives of the equations in the '048 and '297 patents:

$$\text{DelayCorner} = \text{Delay0} + (K1*V*\text{Fanout} + K2*V*\text{Ramptime} + K3\,V*\text{Fanout}*\text{Ramptime} + K4V)*\text{Delta}V \quad \text{Equation 1}$$

$$\text{DelayCorner} = \text{Delay0} + (K1*T*\text{Fanout} + K2*T*\text{Ramptime} + K3\,T*\text{Fanout}*\text{Ramptime} + K4T)*\text{Delta}V \quad \text{Equation 2}$$

where: Delay0 is a prior delay; K1, K2 are derating equation factors as described in the '297 and '048 patents; T, V are temperature and voltage; and Fanout, Ramptime are the fanout and ramptime of the ASIC components under investigation.

The above equation is also equally good for other timing considerations like setup/hold. When calculating delay, a cell delay library is used, with the cell delay library including a table for each timing arc in the library, indexed by input ramptime and output fanout load. The base corner library is then characterized for delay values, at four points. The delay number of these four points plus equations (1) and (2) is used to calculate the four K factors. Once the K factors are obtained, another library can be generated from this base library, using equations (1) and (2). However, since equations (1) and (2) are linear with respect to V and T, and vary as the square with respect to Fanout and Ramptime, the delay vs. PVT is highly nonlinear, and this causes a decrease in accuracy when a corner library is far away from the base corner.

What is lacking in the prior art is a method and apparatus for an improved process to calculate delay and to generate libraries for ASIC components during STA, such as taught in the present invention.

SUMMARY OF THE INVENTION

Accordingly, an aspect of the present invention is a method to increase the accuracy when generating delay calculations when characterizing ASIC cells in low submicron processes.

A further aspect of the present invention is a method of using multiple derating factors for different STA sign-off corners.

Another aspect of the present invention is a method of increasing the accuracy of delay calculations and library generation at corners other than standard corners, such as off-corners.

Another aspect of the present invention is keep the library generation time to a minimum while maintaining acceptable accuracy.

Yet another aspect of the present invention is to propose a method for delay calculation flow to use multi-set of multi-point derating factors K, to do delay calculations or to generate off-corner libraries in STA timing sign off, all the while keeping the characterized base library calculation numbers to a minimum, speeding up the delay and characterization.

Thus the present invention enables a fast, accurate way for timing library generation for deep sub-micron semiconductors.

The sum total of all of the above advantages, as well as the numerous other advantages disclosed and inherent from the invention described herein, creates an improvement over prior techniques.

The above described and many other features and attendant advantages of the present invention will become apparent from a consideration of the following detailed description when considered in conjunction with the accompanying drawings.

BRIEF DESCRIPTION OF THE DRAWINGS

Detailed description of preferred embodiments of the invention will be made with reference to the accompanying drawings. Disclosed herein is a detailed description of the best presently known mode of carrying out the invention. This description is not to be taken in a limiting sense, but is made merely for the purpose of illustrating the general principles of the invention. The section titles and overall organization of the present detailed description are for the purpose of convenience only and are not intended to limit the present invention.

FIG. 2 is data illustrating the improvement in performance over prior techniques in accordance with the present invention.

Figure 1:
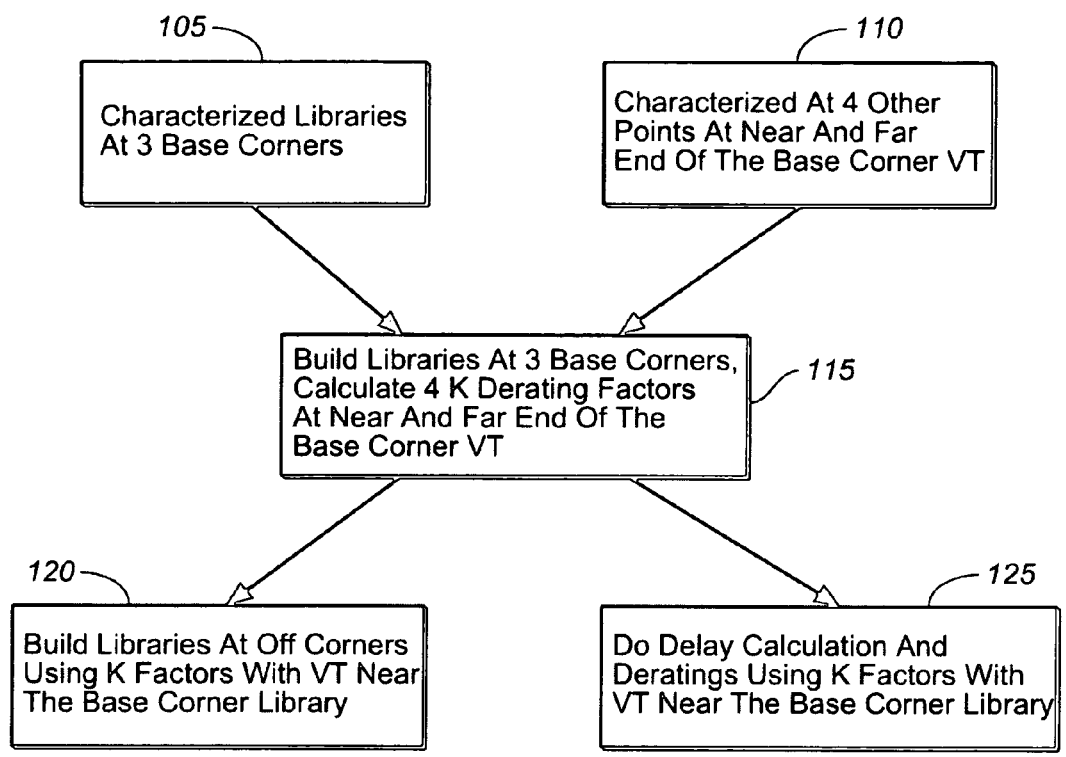
FIG. 1 is a basic flowchart for achieving the present invention.

It should be understood that one skilled in the art may, using the teachings of the present invention, vary embodiments shown in the drawings without departing from the spirit of the invention herein. In the figures, elements with like numbered reference numbers in different figures indicate the presence of previously defined identical elements.

DETAILED DESCRIPTION OF THE INVENTION

The present invention is a method to insert multiple corner deratings for delay calculations and library generation in a multi-corner STA sign-off methodology. An apparatus and method is disclosed to characterize a new process using an improved delay calculation. Multiple derating factors are used for different STA sign off corners. The approach of the present invention does not add any extra work in cell library characterization, while in the mean it increases the accuracy of the delay calculation and the library generation at corners other than standard corners.

In a preferred embodiment, the method and apparatus of the present invention can employ a mainframe or personal computer to run any software tool that incorporates the invention, and in general any compatible piece of hardware or virtual machine can run the present invention, in particular during the logical and physical design of a circuit such as an ASIC. Thus a preferred method and apparatus of the present invention is a computing platform running a software tool, which can accept human input, and may be written in any computer language (such as C, C++, Perl, Java or the like), and/or an Object Oriented programming (OOP) language, run by a computer system having an operating system. The computer system typically has one or more processors, primary and secondary memory cooperating with the processor(s), which executes instructions stored in the memory, I/O means such as monitor, mouse and keyboard, and any necessary specialized hardware or firmware. Depending on the language used to construct and implement the software tool, the object code of the tool may have any number of classes, functions, objects, variables, templates, lines of code, portions of code and constructs (collectively and generally, "a process step", "step", "block", "method", "module", "functional module" or "software module") to carry out the invention in successive stages as described and taught herein, and may be either a standalone software application, or employed inside of or called by another software application, or as firmware. The software process or software module may be constructed so that one portion of code in the application performs a plurality of functions, as for instance in Object Oriented programming (e.g., an overloaded process). The converse is also true, in that a plurality of portions of code could perform a plurality of functions, and still be functionally the same as a single portion of code. At any stage of the process step of the present invention, intermediate values, variables and data may be stored for later use by the program.

Turning attention now to FIG. 1, the flowchart of the present invention is shown. The steps of the flowchart are not necessarily rigid and structured to flow from a first step A to a second step B, but are more free flowing, as indicated by the boxes and the arrows, which represent a number of steps within each box, consistent with the complex, multifaceted steps associated with ASIC design.

Thus, a first step would be to characterize the libraries forming the base corners, from which the so-called off-corner libraries are measured. In FIG. 1, this step is illustrated by box 105 labeled "Characterized Libraries At 3 Base Corners". Characterization may be performed by standard ASIC tools for this purpose, known per se in the art, which may be homegrown or commercial products, e.g. such as NanoChar by Synopsys. For purposes of this invention, the base corner libraries or base corner points chosen from the set of all possible libraries or points include: BC PVT (best case for P, V and T); NOM PVT (nominal case for P, V and T); and WC PVT (worse case for P, V and T). Note this is a smaller set of base corner points than the set of all possible corner libraries or points that can be generated for all the different PVT combinations, such as indicated in the background of the invention, hence these base corner library points or base corners can be termed a limited set of base corner library points from the set of all possible library points.

Next, a second step would be to derive two sets (four points) to be used for calculating derating K factors at near and far ends of the spectrum of parameters from the base corner voltage (V) and temperature (T) parameters, given a particular process, called "off-corner" points. This is indicated in FIG. 1 by the step box 110 labeled "Characterized At 4 Other Points At Near And Far End Of The Base Corner VT". At these points STA is performed by standard ASIC tools for this purpose, known per se in the art, e.g. such as by Nano-Char. Hence, to give but one example, if the base corner library is BC PVT (best case for P, V and T), then two sets of off-corner points would be:

Off-corner point A: BC PV+WCT (best case P, V and worse case T)

Off-corner point B: BC PV+BCT+$\Delta$T (best case P, V and best case T plus a small deviation/perturbation in temperature, $\Delta$T)

Off-corner point C: BC PT+WCV (best case P, T and worse case V)

Off-corner point D: BC PT+BCV+ΔV (best case P, T and best case V plus a small deviation/perturbation in voltage, ΔV)

To give a concrete example, but in no way limiting, for a 90 nm process node (the parameter(s) for a particular process node being shared in common by the base corner library and off-corner points) a best case temperature (BCT) might be a low temperature such as −40 C, while a worse case temperature (WCT) might be a high temperature such as 125 C, while a best case voltage (BCV) might be a high voltage like using the supply voltage plus 10%, i.e., VDD+10%, while a worse case voltage (WCV) might be a low voltage like using the supply voltage minus 10%, i.e., VDD−10%. The off-corner points A, C, above, involving the worse case for temperature and voltage, are termed "far" points to the base corner, while the off-corner points B, D above, involving the best case for temperature and voltage, and a small perturbation Δ as shown, are termed the "near" points to the base corner. The above values for near and far points are only illustrative and not limiting. For example, the near point temperature might be slightly higher than the nominal temperature yet still be considered a near point. For instance, say the nominal base case temperature is 25 C; the far point temperature might be 125 C, which is hot and deleterious long term, while the near point temperature might be say 35 C, slightly higher than the nominal base case temperature. Yet the nomenclature of "near" and "far" would still hold.

The far off-corner points are used mainly for legacy purposes for enabling computation using libraries and methodologies from larger process nodes (i.e., using libraries and calculations from 130 nm in a 90 nm process), while the near off-corner points are used mainly for present processes.

Off-corner points are likewise chosen for the other remaining base corners, i.e. in the example herein for base corners NOM PVT and WC PVT. Hence these off-corner points would be as follows:

For the NOM PVT (Nominal P, V and T) base corner:

Off-corner point A2: NOM PV+WCT (nominal P, V and worse case T)

Off-corner point B2: NOM PV+BCT+ΔT (nominal P, V and best case T plus a small deviation/perturbation temperature, ΔT)

Off-corner point C2: NOM PT+WCV (nominal P, T and worse case V)

Off-corner point D2: NOM PT+BCV+ΔV (nominal P, T and best case V plus a small deviation/perturbation voltage, ΔV)

The off-corner "far" points above would be A2, C2, while the off-corner "near" points would be B2, D2.

For the WC PVT (Worse case P, V and T) base corner:

Off-corner point A3: WC PV+WCT+ΔT (worse case P, V and worse case T plus a small deviation/perturbation temperature, ΔT)

Off-corner point B3: WC PV+BCT (worse case P, V and best case T)

Off-corner point C3: WC PT+WCV+ΔV (worse case P, T and worse case V plus a small deviation/perturbation voltage, ΔV)

Off-corner point D3: WC PT+BCV (worse case P, T and best case V).

The off-corner "far" points above would be B3, D3, while the off-corner "near" points would be C3, A3.

The above example for off-corner points and particular base corners are representative rather than limiting, and other base corners and off-corner points may be chosen by one of ordinary skill from the teachings herein.

Next, in step 115 in FIG. 1, at the box labeled "Build Libraries At 3 Base Corners, Calculate 4 K Derating Factors At Near And Far End Of The Base Corner VT", using the methodology of the present invention, as implemented by suitable computer hardware, one will build libraries associated with the circuit components at the three base corners (in our example BC PVT, NOM PVT and WC PVT). Libraries may be built using standard off-the-shelf third party programs, as is known per se, including but not limited to Nano-Char, and SPICE or HSPICE by Synopysis.

Further, at step 115, the K derating factors are computed for the off-corner points for all the near and far points, for every two sets of off-corner points as described herein, for each of the three base corners. The two sets of derating K factors are calculated for each base corner using eq. (1) and (2) as described in the background of the invention, and the methodology of the '048 and '297 patents.

Next, in step 120 of the box in FIG. 1 labeled "Build Libraries At Off Corners Using K Factors With VT Near The Base Corner Library", the results from step 115 are used to build libraries, using commercial off-the-shelf programs including but not limited to SPICE, using the K factors and using the near off-corner points for V, T, as explained herein. From a SPICE correlation result it was found that that accuracy improved by two-fold over prior techniques, as explained more fully in FIG. 2.

Finally, in step 125 of the box of FIG. 1 labeled "Do Delay Calculation And Deratings Using K Factors With VT Near the Base Corner Library", the K factors are used from step 115, as explained and derived herein, to help compute delay calculations for the near off-corner points for V, T for the delay in the ASIC under consideration.

Numerous base corners may be chosen, as can be appreciated by one of of ordinary skill in the art; the examples given in a preferred embodiment herein are merely illustrative.

Turning attention now to FIG. 2, there is shown data illustrating the improvement in performance over prior techniques in accordance with the present invention. As indicated herein, when comparing SPICE calculations up to a two-fold improvement in accuracy is possible over prior techniques. Further, an experiment was performed to test the accuracy of the present invention, and summarized in FIG. 2, where the rise timing delay for a cell termed "nd2m1d" was found, the A to Z rise timing delay from data in the present assignee's LSI Glxd 13 nm technology. For an off-corner consisting of WC PV+BC T, the data of columns labeled % Diff1 and % Diff2 in FIG. 2 show the accuracy of the delay number with respect to a so-called "golden characterization number". The golden characterization number value is the exact value that would be computed by a "golden" (or exact) simulator like HSPICE, and this is the value that is being predicted by the model of the present invention. In FIG. 2, the column % Diff1 is using the K factors obtained near the base corner WC PVT, while the column % Diff2 is using the K factors obtained from near the off-corner WC PV+BT. Generally these percentage differences in accuracy are very satisfactory, given the time constraints.

In addition, the two sets of deratings factors for each off-corner are also good for calculating not only the propagation delays and output slew rates, but are also good for computing setup and hold times; collectively termed delay for the ASIC being constructed in accordance with the present invention.

Although the present invention has been described in terms of the preferred embodiments above, numerous modifications and/or additions to the above-described preferred embodiments would be readily apparent to one skilled in the art.

It is intended that the scope of the present invention extends to all such modifications and/or additions and that the scope of the present invention is limited solely by the claims set forth below.

We claim:

1. Computer executable program code embodied in a non-transitory computer usable medium for configuring a processor to compute the delay of an integrated circuit (IC), said computer executable code comprising:
a base corner module for characterizing libraries, for an IC being constructed, about three base corner points comprising BC PVT, NOM PVT and WC PVT;
an off-corner module for calculating K factors for four off-corner points to the base corner points; and,
a delay computing module for calculating delay for the off-corner points using the K factors;
wherein:
the delay of the IC is calculated using the off-corner point K factors; and
the off-corner points comprise:
for base corner BC PVT (best case for P, best case V and best case T):
Off-corner point A: BC PV+WCT (best case P, best case V and worse case T)
Off-corner point B: BC PV+BCT+$\Delta$T (best case P, best case V and best case T plus a perturbation in temperature, $\Delta$T)
Off-corner point C: BC PT+WCV (best case P, best case T and worse case V)
Off-corner point D: BC PT+BCV+$\Delta$V (best case P, best case T and best case V plus a perturbation in voltage, $\Delta$V); and,
for the NOM PVT (Nominal P, nominal V and nominal T) base corner:
Off-corner point A2: NOM PV+WCT (nominal P, nominal V and worse case T)
Off-corner point B2: NOM PV+BCT+$\Delta$T (nominal P, nominal V and best case T plus a perturbation temperature, $\Delta$T)
Off-corner point C2: NOM PT+WCV (nominal P, nominal T and worse case V)
Off-corner point D2: NOM PT+BCV+$\Delta$V (nominal P, nominal T and best case V plus a perturbation voltage, $\Delta$V); and,
for the WC PVT (Worse case P, worse case V and worse case T) base corner:
Off-corner point A3: WC PV+WCT+$\Delta$T (worse case P, V and worse case T plus a perturbation temperature, $\Delta$T)
Off-corner point B3: WC PV+BCT (worse case P, worse case V and best case T)
Off-corner point C3: WC PT+WCV+$\Delta$V (worse case P, worse case T and worse case V plus a perturbation voltage, $\Delta$V)
Off-corner point D3: WC PT+BCV (worse case P, worse case T and best case V).

2. The invention according to claim 1, wherein:
the base corner module characterizes libraries about base corner points from a limited set of base corner library points from a set of all possible library points; and
an off-corner characterization module for characterizing libraries, for the IC being constructed, about the off-corner points to the base corner points.

3. The invention according to claim 2, wherein:
each of the base corner points have at least two off-corner points;
the base corner points and off-corner points of the base corner points have parameters from a particular process node and parameters of voltage and temperature.

4. The invention according to claim 3, wherein:
each of the base corner points are associated with at least four off-corner points comprising two sets of near and far off-corner points.

5. The invention according to claim 4, wherein:
one near point of each base corner point comprises a parameter of a best case temperature, and one far point of each base corner point comprises a parameter of a worse case temperature, with the near point temperature parameter being a temperature closer to the temperature of the base corner point than the far point temperature parameter; and
one near point of each base corner point comprising a parameter of a normal supply voltage for the IC being constructed plus an increment above the normal supply voltage, and a far point of each base corner point comprising a parameter of a normal supply voltage for the IC being constructed plus an increment below the normal supply voltage.

6. The invention according to claim 5, further comprising:
a module for building libraries at the plurality of off-corner points using the K factors, and using the near point, best case temperature and near point, best case voltage for each near off-corner point.

7. The invention according to claim 6, wherein:
the delay computing module computing delay for the IC according to the K factors for at least one of the near point temperature and voltage parameters.

8. The invention according to claim 7, wherein:
the base corner module characterizes the delay in the IC and the delay computing module computes the delay for the IC where the delay comprises propagation delay and output slew rates; and,
the process node is 90 nm, the best case temperature ranges from −40 C to 35 C, while the near point voltage varying from zero to +10% above the normal supply voltage.

9. The invention according to claim 1, further comprising:
a module for building libraries at the plurality of off-corners using the K factors, and the near point temperature and best case voltage for each of:
points B, D for the base corner BC PVT;
points B2, D2 for the base corner NOM PVT; and
points B3, D3 for the base corner WC PVT; and,
a delay computing module computing delay for the IC according to the K factors for the near points B, D; B2, D2 and A3, C3.

10. A method for computing the delay in an integrated circuit (IC), executed by a processor, comprising the steps of:
characterizing the IC about three base corner points BC PVT, NOM PVT and WC PVT;
characterizing the IC about four off-corner points associated with the each of the base corner points;
calculating K factors for the off-corner points to the base corner points;
calculating a delay for the IC according to the K factors calculated for each of the off-corner points,
building libraries for the IC at each of the off-corner points;
wherein:
delay is calculated using the K factors for each of the off-corner points; and
the near and far off-corner points comprise, for each of the base corner points:
for base corner BC PVT (best case for P, best case V and best case T):

Off-corner point A: BC PV+WCT (best case P, best case V and worse case T)

Off-corner point B: BC PV+BCT+ΔT (best case P, best case V and best case T plus a perturbation in temperature, ΔT)

Off-corner point C: BC PT+WCV (best case P, best case T and worse case V)

Off-corner point D: BC PT+BCV+ΔV (best case P, best case T and best case V plus a perturbation in voltage, ΔV); and, for the NOM PVT (Nominal P, nominal V and nominal T) base corner:

Off-corner point A2: NOM PV+WCT (nominal P, nominal V and worse case T)

Off-corner point B2: NOM PV+BCT+ΔT (nominal P, nominal V and best case T plus a perturbation temperature, ΔT)

Off-corner point C2: NOM PT+WCV (nominal P, nominal T and worse case V)

Off-corner point D2: NOM PT+BCV+ΔV (nominal P, nominal T and best case V plus a perturbation voltage, ΔV); and, for the WC PVT (Worse case P, worse case V and worse case T) base corner:

Off-corner point A3: WC PV+WCT+ΔT (worse case P, worse case V and worse case T plus a perturbation temperature, ΔT)

Off-corner point B3: WC PV+BCT (worse case P, worse case V and best case T)

Off-corner point C3: WC PT+WCV+ΔV (worse case P, worse case T and worse case V plus a perturbation voltage, ΔV)

Off-corner point D3: WC PT+BCV (worse case P, worse case T and best case V).

11. The method according to claim 10, further comprising the steps of:

forming off-corner points to each of the base corner points, with each base corner point having at least one pair of off-corner points.

12. The method according to claim 11, wherein:

each of the off-corner points to the base corner points and the base corner points have parameters from a particular process node and have parameters of temperature and voltage;

each of the base corner points have at least two off-corner points, the off-corner points having a near point temperature and a near point voltage;

the near point temperature of the off-corner points being a best case temperature parameter with respect to the temperature comprising the base corner temperature;

the near point voltage comprising a normal supply voltage for the IC plus an increment above the normal supply voltage.

13. The method according to claim 12, further comprising the steps of:

building libraries for the IC at the plurality of off-corners using the K factors, the near point temperature and near point voltage.

14. The method according to claim 13, further comprising the steps of:

computing delay for the IC according to the K factors for the near point temperature and near point voltage of the off-corners.

15. The method according to claim 14, wherein:

the pair of off-corner points associated with each base corner point, comprise a near point and a far point, the far point comprising a far point temperature and a far point voltage;

the near point comprises a parameter of a best case temperature, and the far point comprises a parameter of a worse case temperature, with the near point temperature being a temperature closer to the temperature of the base corner point than the far point temperature of the base corner point;

each of the base corner points is further associated with an additional pair of off-corner points comprising a near point comprising a parameter of a normal supply voltage for the IC plus an increment above the normal supply voltage, and the far point comprising a parameter of a normal supply voltage for the IC plus an increment below the normal supply voltage.

16. The invention according to claim 10, further comprising:

building libraries at the plurality of off-corners using the K factors, and the temperature and voltage for each off-corner of points B, D for the base corner BC PVT; points B2, D2 for the base corner NOM PVT; and points A3, C3 for the base corner WC PVT, and, computing the delay for the IC according to the K factors for the near points B, D; B2, D2 and A3, C3.

17. Computer executable program code embodied in a non-transitory computer usable medium for configuring a processor to compute timing in an IC according to multiple derating factors for different sign off corners, said computer executable code comprising:

means for characterizing the IC about at three base corner points comprising BC PVT, NOM PVT and WC PVT;

means for characterizing the IC about four off-corner points associated with each of the base corner points;

means for calculating K factors for the off-corner points to the base corner point; and means for calculating a delay for the IC according to the K factors calculated for each of the off-corner points, means for building libraries for the IC at each of the off-corner points;

wherein:

delay is calculated using the K factors for each of the off-corner points;

the means for characterizing the IC about three base corner points characterizes libraries about base corner points from a limited set of base corner library points from the set of all possible library points;

the base corner points and off-corner points associated with the base corner points have parameters from a particular process node and parameters of voltage and temperature;

each of the base corner points are associated with exactly two pairs of off-corner points comprising near and far off-corner points;

the near points of the off-corner points having parameters of best case temperature, and the far points of the off-corner points having parameters of a worse case temperature, with the near point temperature of an off-corner being a temperature closer to the temperature of the base corner point related to the off-corner than the far point temperature;

the off-corner points further comprising a near point voltage comprising the normal supply voltage for the IC plus an increment above the normal supply voltage, and the far point voltage comprising the normal supply voltage for the IC being constructed plus an increment below the normal supply voltage;

the means for building libraries for the IC at each of the off-corner points uses the K factors, and uses the near point, best case temperature and near point, best case voltage for each off-corner when building libraries; and the delay for the IC is calculated using the K factors for the off-corner points.

* * * * *